United States Patent [19]

Korb et al.

[11] Patent Number: 4,582,458
[45] Date of Patent: Apr. 15, 1986

[54] STEPPED DRILL CONSTRUCTION

[75] Inventors: William B. Korb, Melrose, Conn.; Francis R. Wallace, Indian Orchard, Mass.

[73] Assignee: American Saw & Mfg. Company, East Longmeadow, Mass.

[21] Appl. No.: 639,227

[22] Filed: Aug. 9, 1984

[51] Int. Cl.⁴ .............................................. B23B 51/02
[52] U.S. Cl. .................................................... 408/224
[58] Field of Search ................ 408/223, 224, 225, 206

[56] References Cited

U.S. PATENT DOCUMENTS

| | | | |
|---|---|---|---|
| 2,276,532 | 3/1942 | Welty | 408/224 |
| 2,786,373 | 3/1957 | Patton | 408/224 |
| 2,897,696 | 8/1959 | Fisserant | 408/225 |
| 3,076,356 | 2/1963 | Simich | 408/223 |
| 3,564,945 | 2/1971 | Bradley | 408/224 |
| 3,758,222 | 9/1973 | Oakes | 408/224 |
| 4,090,807 | 5/1978 | Stewart | 408/225 |

FOREIGN PATENT DOCUMENTS 725505  5/1932  France .................................. 408/223

Primary Examiner—Gil Weidenfeld
Assistant Examiner—Daniel W. Howell
Attorney, Agent, or Firm—Chapin, Neal & Dempsey

[57] ABSTRACT

Drill bit for drilling holes of different diameters which has a series of cylindrical outer surfaces of increasing diameter from the outer to the inner end of the drill bit. A beveled conical surface interconnects each adjacent pair of cylindrical surfaces. At least two flutes are machined at two circumferentially spaced locations to provide two cutting edges on each diameter of the drill. At each cutting edge the cylindrical surfaces are relieved radially and the conical surface is relieved axially over an acute circumferential angle. The major peripheral portions of the cylindrical and conical surfaces for each diameter are respectively concentric to the axis of the drill and of zero pitch angle.

6 Claims, 8 Drawing Figures

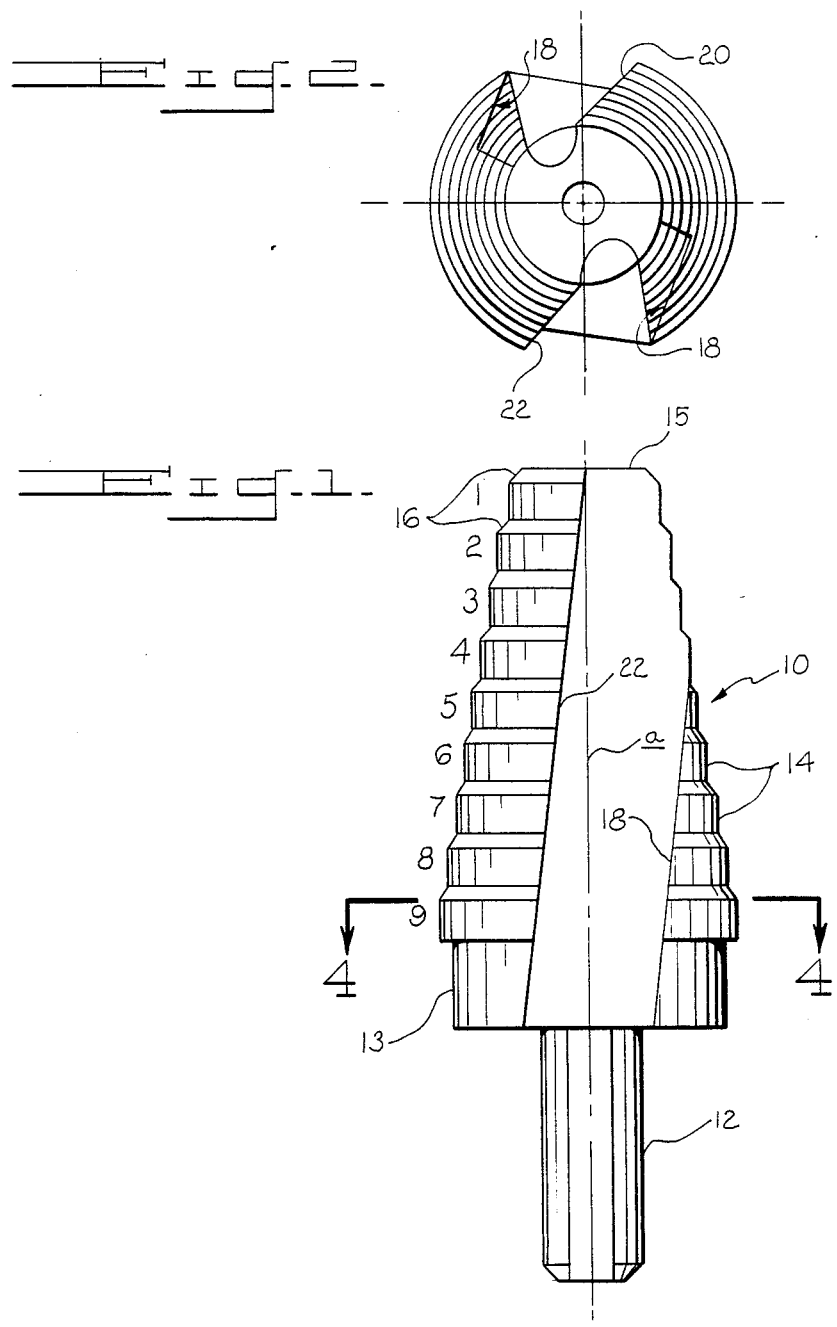
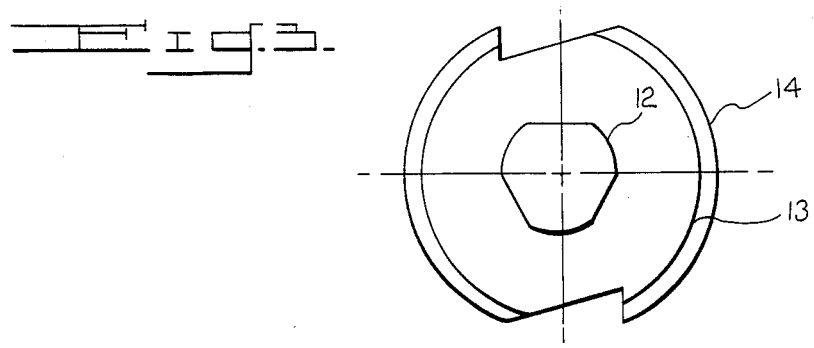

STEPPED DRILL CONSTRUCTION

BACKGROUND OF THE INVENTION

This invention relates to drill bits of stepped construction for drilling holes of different diameters.

Drill bits of this general category have been known for some time and are disclosed in the following prior U.S. Patents to Tisserant U.S. Pat. No. 1,897,696; Bradley U.S. Pat. No. 3,564,945 and Oakes U.S. Pat. No. 3,758,222. In Tisserant, a stepped drill construction is shown in which adjacent cylindical surfaces are connected by shoulders which form the cutting edges 24. Each cutting edge is disposed at a predetermined pitch for proper cutting clearance. In the Bradley patent each step portion of the drill is "radiused" without any other intermediate surface interconnecting the cylindrical surfaces of the drill. These radiused surfaces provide the cutting edges and each radiused cutting edge is "backed off" and axially "relieved" to provide clearance behind for cutting edges. In effect, the cutting edges thus have a angular pitch, as also disclosed in the Tisserant patent. In the Oakes patent, the drill has a single flute and the cylindrical surfaces are connected by beveled portions which extend helically to provide axial clearance for the drill.

SUMMARY OF THE INVENTION

The present invention provides a stepped drill of the same general type as disclosed in the previous art but which is uniquely constructed to give improved cutting performance. In particular, the stepped drill bit has two cutting flutes which provides a pair of circumferentially spaced cutting edges for each different diameter. Each cutting diameter of the drill bit is defined by two generally cylindrical surface portions and two generally conical portions. The cutting edges of each cylindrical portion have leads which are relieved radially over a relatively small acute angle leaving concentric surfaces over the remainder of the circumference of the drill. Between adjacent cylindrical surfaces are step or shoulder portions of conical configuration and at each cutting edge, the conical surfaces have leads with tapered back clearances extending over only an acute angle of the drill circumference. The remainder of the conical surface has zero pitch which limits the chip thickness and prevents jamming of the drill in the work due to over-feeding.

Drills constructed in accordance with this invention have accurately controlled rates of feed during drilling operations. In addition, such drills minimize the problems of axial wobble and drill chatter common to prior art drills of this type. In addition, holes drilled by these drills have improved concentricity.

The principal object of this invention is to provide an improved stepped drill construction which overcomes the drawbacks of prior art drill bits of the same general type.

The above and other objects and advantages of this invention will be more readily apparent from the following description read in conjunction with the accompanying drawings, in which:

FIG. 1 is an elevational view of one type of stepped drill bit construction of the type embodying this invention;

FIG. 2 is a top plan view of the drill bit of FIG. 1;

FIG. 3 is a bottom plan view of the drill bit of FIG. 1;

FIG. 8 is a top plan view of the drill of FIG. 7.

Figure 4:
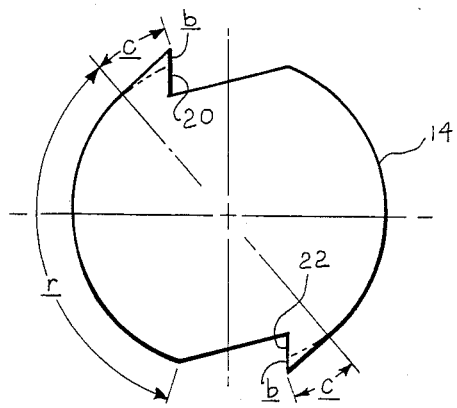
FIG. 4 is a section taken along line 4—4 of FIG. 1.

Referring in detail to the drawings in FIG. 1 is shown a drill bit or hole cutter 10 of stepped construction. The drill bit comprises a shank 12 suitable for being drivingly coupled with the chuck of a power drill (not shown). The drill bit includes a cylindrical base 13 and a plurality of vertically-spaced, essentially cylindrical surfaces 14 of progressively decreasing outer diameter from the shank end to the tip end 15 of the drill. In the illustrated embodiment of FIG. 1, there are shown nine different cylindrical surfaces of incrementally varying diameters from 1 inch to ½ inch. Of course, the number and diameters of such surfaces may be selected as desired.

Intermediate each adjacent pair of cylindrical surfaces 14, the outer surface of the drill bit comprises tapered or conical surfaces 16. A similar conical surface 16 also extends from the outer edge of surface 15 to the upper edge of the smallest cylindrical surface. Except for the cutting edge portions of the drill, as will be hereinafter described, the cylindrical surfaces 14 and conical surfaces 16 are concentric to the longitudinal axis a of the drill. The conical surfaces are inclined at approximately a 45 degree angle relative to the cylindrical surfaces.

The drill bit 10 is machined to provide two flutes 18 each of which removes a sector of about 50 degrees of the periphery of the drill, thus leaving an unfluted arcuate portion of about 260 degrees or 130 degrees following each cutting edge. The flutes may be cut helically about the drill or longitudinally at a fixed angle to the drill axis from about 0 to 15 degrees with the preferred angle being 7 degrees. The flutes define cutting edges 20 and 22, which as shown in FIG. 2, are adapted to drill holes of selected diameter in a clockwise rotating drill, as viewed from the shank end of the drill bit.

As illustrated in FIGS. 1 and 2, for each diameter the cutting edges 20 and 22 of the drill bit 10 are defined by the intersection of the left-hand margin of the two flutes 18, the cylindrical surface 14 and conical surface 16.

As best illustrated in FIG. 4, at its cutting edges 20 and 22, each cylindrical surface 14 has a radially raised portion or lead b in the range of 0.002 to 0.050 inch with a relief or back taper which extends over a horizontal angle c of 5–60 degrees with 0.005 inch and 30 degrees being considered preferable. The remainder r of the periphery of each cylindrical surface is machined to be concentric to the drill axis a.

Figure 5:
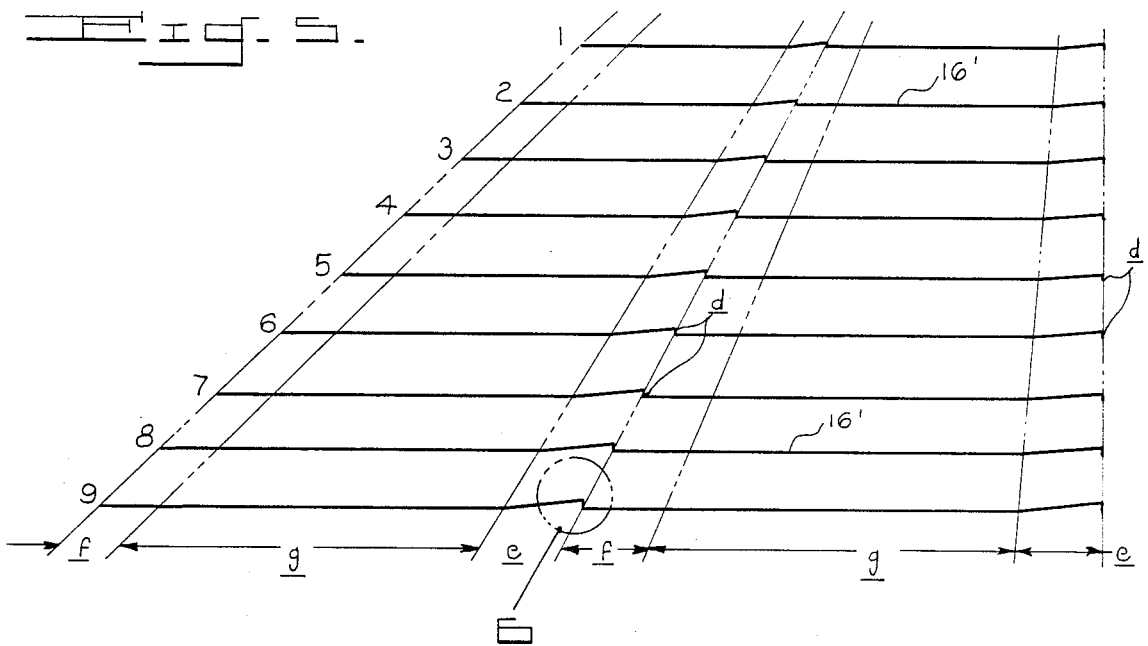
FIG. 5 is a planar projection on an enlarged scale illustrating the contours of the conical surfaces of the drill bit.
Figure 6:
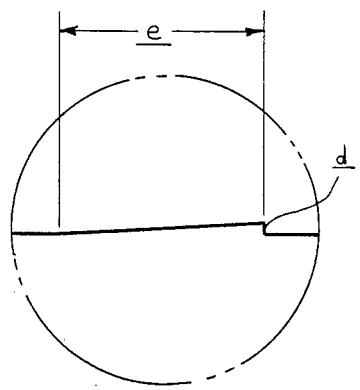
FIG. 6 is a greatly enlarged view illustrative of the lead on one conical cutting edge of the drill showing its tapered back relief.
Figure 6:
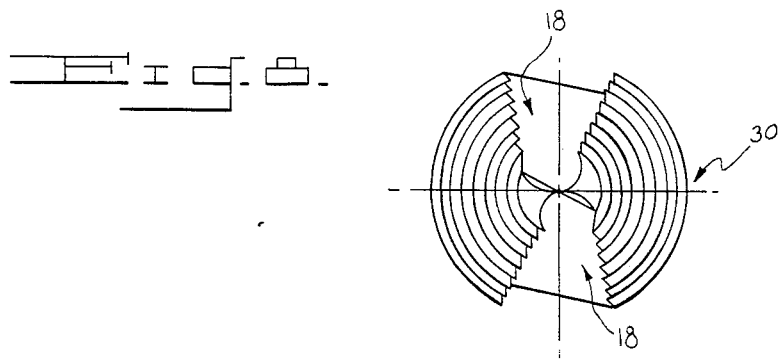

In addition to the radial relief of lead b, the conical surfaces of the drill bit also have a raised portion or lead d on the cutting edge which is also tapered or relieved over an angle of 5–60 degrees, the preferred angle being considered 30 degrees. In FIG. 5, the conical surfaces 16 are illustrated by a series of flat or planar projections designated 16'. Horizontal lines 16' represent transverse sections through the conical surfaces of the drill bit 10. Each conical surface 16' in FIG. 5, includes a raised portion or lead d which may have a height of from 0.005 to 0.050 inch, and with an arcuate back taper extending over a range of from 5 to 60 degrees. A lead of 0.015 inch and a back taper of 30 degrees are considered preferable. The remainder of each line 16' designated g has no taper, meaning that such conical portions of the drill bit have zero pitch.

It has been found that the zero pitch portions of the conical surfaces 16 and the concentric portions of the cylindrical surfaces 14 are important in providing significantly improved cutting action. The extensive, concentric outer portions of surfaces 14 dramatically aid in preventing wobble of the drill bit in the work and result in improved concentricity or roundness of the holes being drilled. In addition, the zero pitch portions of the conical surfaces provide riding surfaces which inhibit excessively rapid feed of the bit into the work, limit chip size and prevent jamming of the cutter in the work due to over-feeding. In conventional drills of this type, such jamming in the work is a common occurrence.

Figure 7:
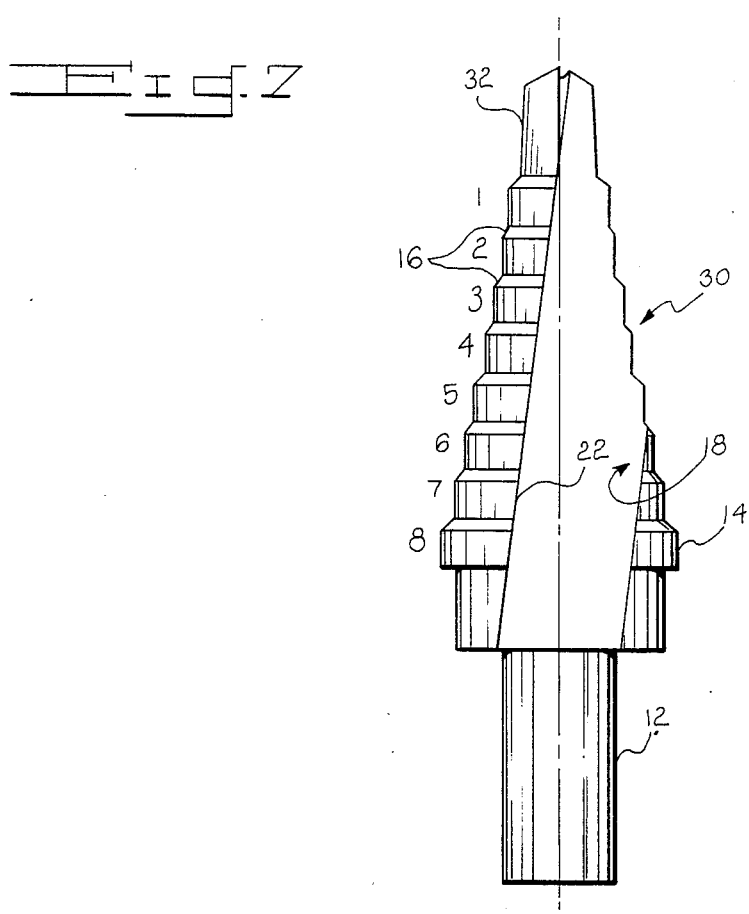
FIG. 7 is an elevational view of a modified form of drill bit with a pilot drill point.

Referring now to FIGS. 7 and 8, another stepped drill 30 is shown which is geometrically equivalent to the drill bit 10 heretofore described in detail and as a matter of convenience, corresponding portions of the two embodiments are identified by the same reference characters. At its outer end, the drill bit 30 is provided with a split tip pilot drill point 32.

Having thus described this invention what is claimed is:

1. Drill bit of stepped construction having a shank at one end and a series of generally cylindrical outer surfaces of incrementally decreasing diameter from the shank end to the outer end thereof, said drill bit comprising a beveled conical surface interconnecting each adjacent pair of cylindrical surfaces, at least two flutes machined into opposite sides of the drill bit to provide at least two cutting edges for each diameter defined by the intersection of one surface of each of said flutes, each of said cylindrical surfaces and each of said conical surfaces, a raised portion on each of the conical cutting edge surface, said raised portion having a tapered back relief over an acute angle which is substantially less than the peripheral extent of said conical surfaces.

2. Drill bit as set forth in claim 1, in which the conical surfaces of said drill, other than said acute angle have substantially zero pitch relative to the axis of said drill bit.

3. Drill bit as set forth in claim 2, in which the cylindrical portions thereof each have a raised radial portion at the cutting edge thereof, each raised portion being relieved radially by an inwardly tapered surface which extends over a second acute angle substantially smaller than the peripheral extent of said cylindrical portions of the bit, except for the second acute angle, said cylindrical portions being essentially concentric with the axis of said drill bit.

4. Drill bit as set forth in claim 3, in which the first and second acute angles are equal and are within the range of 5 to 60 degrees.

5. Drill bit as set forth in claim 4, in which the raised portions of said conical surfaces are within the range of 0.005 to 0.050 inch and the raised portion on the cylindrical surfaces are approximately 0.002 to 0.050 inch, the first and second acute angles being approximately 30 degrees.

6. Drill bit as set forth in claim 5, in which the flutes each extend over approximately a 50 degree sector of the drill bit and each of the remaining peripheral portions of the drill is about 130 degrees, said flutes being machined into said drill bit at angle of 3 to 10 degrees relative to the axis of said drill bit.

* * * * *